US009451048B2

(12) United States Patent
Wang

(10) Patent No.: US 9,451,048 B2
(45) Date of Patent: Sep. 20, 2016

(54) METHODS AND SYSTEMS FOR IDENTIFYING INFORMATION OF A BROADCAST STATION AND INFORMATION OF BROADCASTED CONTENT

(71) Applicant: Shazam Investments Ltd., London (GB)

(72) Inventor: Avery Li-Chun Wang, Palo Alto, CA (US)

(73) Assignee: Shazam Investments Ltd., London (GB)

( * ) Notice: Subject to any disclaimer, the term of this patent is extended or adjusted under 35 U.S.C. 154(b) by 214 days.

(21) Appl. No.: 13/795,194

(22) Filed: Mar. 12, 2013

(65) Prior Publication Data

US 2014/0280265 A1 Sep. 18, 2014

(51) Int. Cl.
*G06F 17/00* (2006.01)
*H04L 29/06* (2006.01)
*H04H 60/37* (2008.01)

(52) U.S. Cl.
CPC .............. *H04L 67/42* (2013.01); *H04H 60/37* (2013.01)

(58) Field of Classification Search
CPC ...... G06F 17/30; H04H 60/45; H04H 60/40; H04H 60/46; H04H 60/58; H04H 60/73
See application file for complete search history.

(56) References Cited

U.S. PATENT DOCUMENTS 4,450,531 A 5/1984 Kenyon et al.
4,843,562 A 6/1989 Kenyon et al.
5,134,719 A 7/1992 Mankovitz
5,333,275 A 7/1994 Wheatley et al.
5,437,050 A 7/1995 Lamb et al.
5,465,240 A 11/1995 Mankovitz
5,649,060 A 7/1997 Ellozy et al.
5,674,743 A 10/1997 Ulmer
(Continued)

FOREIGN PATENT DOCUMENTS

EP 1936991 6/2008
WO WO 0045511 * 8/2000
(Continued)

OTHER PUBLICATIONS

Kim et al., "Music Emotion Recognition: A state of the Art Review", 11th International Society for Music Information Retrieval Conference (2010).
(Continued)

*Primary Examiner* — Augustine K Obisesan
(74) *Attorney, Agent, or Firm* — McDonnell Boehnen Hulbert & Berghoff LLP

(57) ABSTRACT

Methods and systems for identifying information of a broadcast station and information of broadcasted content are provided. In one example, a method includes receiving at a client device media content rendered by a media rendering source, and the client device making an attempt to determine an identity of the media content based on information stored on the client device. The method also includes based on the attempt of the client device to determine the identity of the media content, determining an identity of the media rendering source. The method further includes based on the attempt of the client device to determine the identity of the media content and on determining the identity of the media rendering source, sending information indicative of the media content to a content recognition server to determine the identity of the media content.

14 Claims, 9 Drawing Sheets

(56) References Cited

U.S. PATENT DOCUMENTS 5,740,230 A 4/1998 Vaudreuil
5,918,223 A 6/1999 Blum et al.
5,952,597 A 9/1999 Weinstock et al.
6,107,559 A 8/2000 Weinstock et al.
6,166,314 A 12/2000 Weinstock et al.
6,476,306 B2 11/2002 Huopaniemi et al.
6,766,523 B2 7/2004 Herley
6,792,007 B1 9/2004 Hamada et al.
6,911,592 B1 6/2005 Futamase
6,966,065 B1 11/2005 Kitazato et al.
6,990,453 B2 1/2006 Wang et al.
7,174,293 B2 2/2007 Kenyon
7,190,971 B1 3/2007 Kawamoto
7,194,752 B1 3/2007 Kenyon et al.
7,277,766 B1 10/2007 Khan et al.
7,444,353 B1 10/2008 Chen et al.
7,461,392 B2 12/2008 Herley
7,523,474 B2 4/2009 Herley
7,549,052 B2 6/2009 Haitsma et al.
7,627,477 B2 12/2009 Wang
7,653,921 B2 1/2010 Herley
7,788,279 B2 8/2010 Mohajer et al.
7,849,131 B2 12/2010 Van de Sluis
8,452,586 B2 5/2013 Master et al.
2002/0072982 A1 6/2002 Barton et al.
2002/0083060 A1 6/2002 Wang et al.
2002/0161741 A1* 10/2002 Wang ................ G06F 17/30017
2003/0033321 A1* 2/2003 Schrempp .............. H04H 20/14
2004/0266337 A1 12/2004 Radcliffe et al.
2005/0044189 A1* 2/2005 Ikezoye .............. G06F 17/3002
709/219
2005/0050047 A1* 3/2005 Laronne .................. G11B 27/11
2005/0086682 A1 4/2005 Burges et al.
2005/0267817 A1 12/2005 Barton et al.
2006/0085343 A1* 4/2006 Milsted et al. ................. 705/64
2006/0112812 A1 6/2006 Venkataraman et al.
2006/0149533 A1* 7/2006 Bogdanov ............... G10L 25/48
704/205
2006/0246408 A1 11/2006 Gao
2007/0143777 A1 6/2007 Wang
2007/0166683 A1 7/2007 Chang et al.
2007/0271300 A1* 11/2007 Ramaswamy ......... H04H 60/40
2008/0082510 A1* 4/2008 Wang ..................... H04H 60/37
2008/0097754 A1 4/2008 Goto et al.
2008/0115655 A1 5/2008 Weng et al.
2008/0196575 A1 8/2008 Good
2008/0256115 A1* 10/2008 Beletski ............ G06F 17/30056
2008/0263360 A1 10/2008 Haitsma et al.
2008/0301280 A1* 12/2008 Chasen ................... H04L 67/02
709/224
2009/0049074 A1* 2/2009 Dara-Abrams ... G06F 17/30017
2009/0070797 A1* 3/2009 Ramaswamy .......... H04L 12/66
725/10
2009/0083281 A1 3/2009 Sarig et al.
2009/0177758 A1* 7/2009 Banger et al. ................ 709/219
2010/0050853 A1 3/2010 Jean et al.
2010/0115542 A1* 5/2010 Lee ...................... G06K 9/0053
725/19
2010/0131280 A1* 5/2010 Bogineni ............ G06F 19/3406
704/275
2010/0145708 A1 6/2010 Master et al.
2010/0211693 A1 8/2010 Master et al.
2010/0247060 A1 9/2010 Gay et al.
2010/0268359 A1 10/2010 Prestenback et al.
2011/0276157 A1* 11/2011 Wang ................ G06F 17/30861
700/94
2011/0289098 A1* 11/2011 Oztaskent ......... G06F 17/30026
707/769
2012/0029670 A1 2/2012 Mont-Reynaud et al.
2012/0191231 A1 7/2012 Wang
2012/0239175 A1 9/2012 Mohajer et al.
2012/0265735 A1* 10/2012 McMillan .......... H04N 21/8352
707/687
2012/0317240 A1 12/2012 Wang

FOREIGN PATENT DOCUMENTS

WO WO 2005/079499 9/2005
WO WO 2008/042953 4/2008
WO WO 2008042953 A1 * 4/2008
WO WO 2009/042697 4/2009
WO WO 2012/112573 8/2012

OTHER PUBLICATIONS

Vy et al., "EnACT: A software tool for creating animated text captions", ICCHP 2008, LNCS 5105, pp. 609-616 (2008).
Geleijnse et al., "Enriching Music with Synchronized Lyrics, Images, and Colored Lights", Ambi-Sys'08, Feb. 11-14, 2008, Quebec, Canada.
Shi-Kuo Chang, Zen Chen, Suh-Yin Lee / Oostveen, J., et al., "Recent Advances in Visual Information Systems", 5th International Conference, VISUAL 2002, "Feature Extraction and a Database Strategy for Video Fingerprinting", Lecture Notes in Computer Science, 2314, (Mar. 11, 2002), 117-128.
Macrae et al., "MuViSync: Realtime Music Video Alignment", available from http://www.xavieranguera.com/papers/icme2010.pdf, at least on Dec. 2, 2010.
Kan et al., "LyricAlly: Automatic Synchronization of Textual Lyrics to Acoustic Music Signals", IEEE Transactions on Audio, Speech and Language Processing, vol. 16, No. 2, Feb. 2008, pp. 338-349.
Mesaros, "Automatic Alignment of Music Audio and Lyrics", Proc. of the 11th Int. Conference on Digital Audio Effects (DAFx-08), Espoo, Finland, Sep. 1-4, 2008, pp. DAFX-1-4.
Young et al., The HTK Book (for HTK Version 3.4), first published Dec. 1995.
Fujihara et al., "Three Techniques for Improving Automatic Synchronization Between Music and Lyrics: Fricative Detection, Filler, Model, and Novel Feature Vectors for Vocal Activity Detection", National Institute of Advanced Industrial Science and Technology, 2008, pp. 69-72.
Fujihara et al., "Automatic Synchronization Between Lyrics and Music CD Recordings based on Viterbi Alignment of Segragated Vocal Signals", Proceedings of the Eighth IEEE International Symposium on Multimedia, 2006.
http://waltdisneyworldflorida.net/walt-disney-news/walt-disney-tron-bambi-to-employ-disneys-second-screen-technology-on-dvd-blu-ray/, visited and printed from Internet May 4, 2011.
http://www.razorianfly.com/2011/02/12/details-on-tron-legacy-for-blu-ray-surface-disneys-second-screen-for-ipad/, visited and printed from Internet on May 4, 2011.
International Search Report and Written Opinion prepared by the European Patent Office in International Patent Application PCT/US2011/035197, mailed Aug. 29, 2011.
International Preliminary Report on Patentability and Written Opinion prepared by the European Patent Office in International Patent Application PCT/US2011/035197, mailed Nov. 15, 2012.
International Search Report and Written Opinion prepared by the European Patent Office in International Patent Application No. PCT/US2014/023342, mailed Aug. 19, 2014.
International Preliminary Report on Patentability and Written Opinion prepared by the European Patent Office in International Patent Application No. PCT/US2014/023342, mailed Sep. 24, 2015.

* cited by examiner

METHODS AND SYSTEMS FOR IDENTIFYING INFORMATION OF A BROADCAST STATION AND INFORMATION OF BROADCASTED CONTENT

FIELD

The present disclosure relates to identifying content in a media stream. For example, the present disclosure relates to cascading methods of performing a content identification of content in a media stream.

BACKGROUND

Content identification systems for various data types, such as audio or video, use many different methods. A client device may capture a media sample recording of a media stream (such as radio), and may then request a server to perform a search in a database of media recordings (also known as media tracks) for a match to identify the media stream. For example, the sample recording may be passed to a content identification server module, which can perform content identification of the sample and return a result of the identification to the client device. A recognition result may then be displayed to a user on the client device or used for various follow-on services, such as purchasing or referencing related information. Other applications for content identification include broadcast monitoring or content-sensitive advertising, for example.

Existing content identification systems may require user interaction to initiate a content identification request. Often times, a user may initiate a request after a song has ended, for example, missing an opportunity to identify the song.

In addition, within content identification systems, a central server receives content identification requests from client devices and performs computational intensive procedures to identify content of the sample. A large number of requests can cause delays when providing results to client devices due to a limited number of servers available to perform a recognition.

SUMMARY

In one example, a method is provided that comprises receiving at a client device media content rendered by a media rendering source, and the client device making an attempt to determine an identity of the media content based on information stored on the client device. The method also includes based on the attempt of the client device to determine the identity of the media content, determining an identity of the media rendering source. The method further includes based on the attempt of the client device to determine the identity of the media content and on determining the identity of the media rendering source, sending information indicative of the media content to a content recognition server to determine the identity of the media content.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

As one example, a non-transitory computer readable medium having stored therein instructions executable by a computing device to cause the computing device to perform functions is provided. The functions comprise receiving media content rendered by a media rendering source, and making an attempt to determine an identity of the media content based on information stored on the client device. The functions also comprise based on the attempt to determine the identity of the media content, determining an identity of the media rendering source. The functions also comprise based on the attempt to determine the identity of the media content and on determining the identity of the media rendering source, sending information indicative of the media content to a content recognition server to determine the identity of the media content.

In still further examples, any type of devices may be used or configured to perform logical functions in any processes or methods described herein. As one example, a device is provided that comprises a database and a content identification module coupled to the database. The database is configured to receive and store information indicative of one or more features of media content and information identifying the media content. The content identification module is configured to (i) make an attempt to determine an identity of received media content rendered by a media rendering source based on a comparison with the stored information in the database, (ii) based on the attempt, to determine an identity of the media rendering source, and (iii) based on the attempt and on the determine the identity of the media rendering source, to send information indicative of the media content to a content recognition server to determine the identity of the media content.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may describe, inter alia, methods and systems for identifying information of a broadcast station and information of broadcasted content. In one example, a method includes receiving at a client device media content rendered by a media rendering source, and the client device making an attempt to determine an identity of the media content based on information stored on the client device. The method also includes based on the attempt of the client device to determine the identity of the media content, determining an identity of the media rendering source. The method further includes based on the attempt of the client device to determine the identity of the media content and on determining the identity of the media rendering source, sending information indicative of the media content to a content recognition server to determine the identity of the media content.

Figure 1:
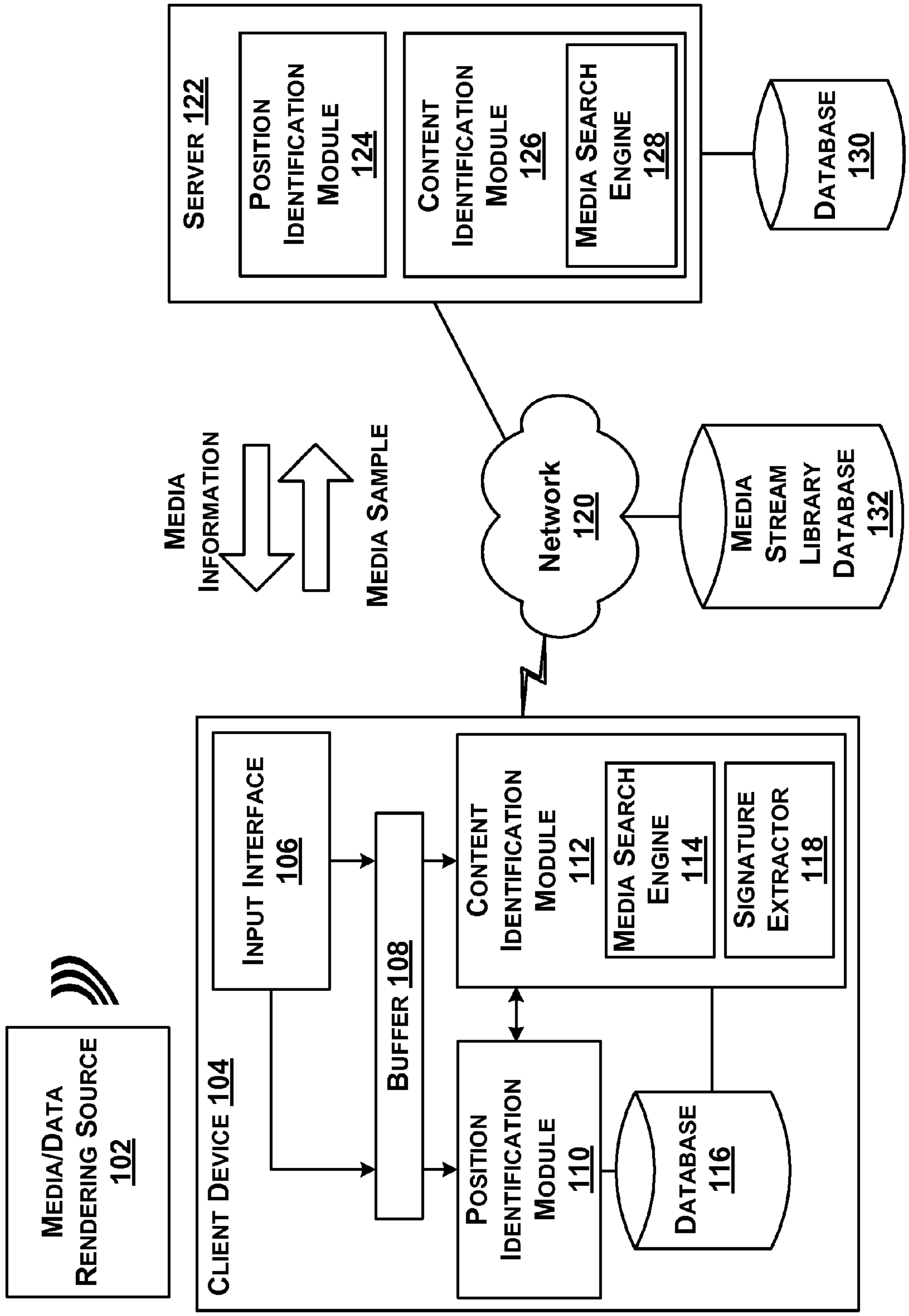
FIG. 1 illustrates one example of a system for identifying content within a data stream and for identifying information of a media rendering source or broadcast station.

Referring now to the figures, FIG. 1 illustrates one example of a system for identifying content within a data stream and for identifying information of a media rendering source or broadcast station. While FIG. 1 illustrates a system that has a given configuration, the components within the system may be arranged in other manners. The system includes a media or data rendering source 102 that renders and presents content from a media stream in any known manner. The media stream may be stored on the media rendering source 102 or received from external sources, such as an analog or digital broadcast. In one example, the media rendering source 102 may be a radio station or a television content provider that broadcasts media streams (e.g., audio and/or video) and/or other information. The media rendering source 102 may also be any type of device that plays or audio or video media in a recorded or live format. In an alternate example, the media rendering source 102 may include a live performance as a source of audio and/or a source of video, for example. The media rendering source 102 may render or present the media stream through a graphical display, audio speakers, a MIDI musical instrument, an animatronic puppet, etc., or any other kind of presentation provided by the media rendering source 102, for example.

A client device 104 receives a rendering of the media stream from the media rendering source 102 through an input interface 106. In one example, the input interface 106 may include antenna, in which case the media rendering source 102 may broadcast the media stream wirelessly to the client device 104. However, depending on a form of the media stream, the media rendering source 102 may render the media using wireless or wired communication techniques. In other examples, the input interface 106 can include any of a microphone, video camera, vibration sensor, radio receiver, network interface, etc. As a specific example, the media rendering source 102 may play music, and the input interface 106 may include a microphone to receive a sample of the music.

Within examples, the client device 104 may not be operationally coupled to the media rendering source 102, other than to receive the rendering of the media stream. In this manner, the client device 104 may not be controlled by the media rendering source 102, and may not be an integral portion of the media rendering source 102. In the example shown in FIG. 1, the client device 104 is a separate entity from the media rendering source 102.

The input interface 106 is configured to capture a media sample of the rendered media stream. The input interface 106 may be preprogrammed to capture media samples continuously without user intervention, such as to record all audio received and store recordings in a buffer 108. The buffer 108 may store a number of recordings, or may store recordings for a limited time, such that the client device 104 may record and store recordings in predetermined intervals, for example, or in a way so that a history of a certain length backwards in time is available for analysis. In other examples, capturing of the media sample may be caused or triggered by a user activating a button or other application to trigger the sample capture. For example, a user of the client device 104 may press a button to record a ten second digital sample of audio through a microphone, or to capture a still image or video sequence using a camera.

The client device 104 can be implemented as a portion of a small-form factor portable (or mobile) electronic device such as a cell phone, a wireless cell phone, a personal data assistant (PDA), tablet computer, a personal media player device, a wireless web-watch device, a personal headset device, an application specific device, or a hybrid device that include any of the above functions. The client device 104 can also be implemented as a personal computer including both laptop computer and non-laptop computer configurations. The client device 104 can also be a component of a larger device or system as well.

The client device 104 further includes a position identification module 110 and a content identification module 112. The position identification module 110 is configured to receive a media sample from the buffer 108 and to identify a corresponding estimated time position ($T_S$) indicating a time offset of the media sample into the rendered media stream (or into a segment of the rendered media stream) based on the media sample that is being captured at that moment. The time position ($T_S$) may also, in some examples, be an elapsed amount of time from a beginning of the media stream. For example, the media stream may be a radio broadcast, and the time position ($T_S$) may correspond to an elapsed amount of time of a song being rendered.

The content identification module 112 is configured to receive the media sample from the buffer 108 and to perform a content identification on the received media sample. The content identification identifies a media stream, or identifies information about or related to the media sample. The content identification module 112 may be configured to receive samples of environmental audio, identify a musical content of the audio sample, and provide information about the music, including the track name, artist, album, artwork, biography, discography, concert tickets, etc.

In this regard, the content identification module 112 includes a media search engine 114 and may include or be coupled to a database 116 that indexes reference media streams, for example, to compare the received media sample with the stored information so as to identify tracks within the received media sample. Once tracks within the media stream have been identified, track identities or other information may be displayed on a display of the client device 104.

The database 116 may store content patterns that include information to identify pieces of content. The content patterns may include media recordings such as music, advertisements, jingles, movies, documentaries, television and radio programs. Each recording may be identified by a unique identifier (e.g., sound_ID). Alternatively, the database 116 may not necessarily store audio or video files for each recording, since the sound_IDs can be used to retrieve audio files from elsewhere. The content patterns may include other information (in addition to or rather than media recordings), such as reference signature files including a temporally mapped collection of features describing content of a media recording that has a temporal dimension corresponding to a timeline of the media recording, and each feature may be a description of the content in a vicinity of each mapped timepoint. Generally, features in the signature file can be chosen to be reproducible in the presence of noise and distortion, for example. The features may be extracted from media recordings sparsely at discrete time positions, and each feature may correspond to a feature of interest. Examples of sparse features include $L_p$ norm power peaks, spectrogram energy peaks, linked salient points, etc. For more examples, the reader is referred to U.S. Pat. No. 6,990,453, by Wang and Smith, which is hereby entirely incorporated by reference.

Alternatively, a continuous time axis could be represented densely, in which every value of time has a corresponding feature value that may be included or represented in a signature file for a media recording. Examples of such dense features include feature waveforms (as described in U.S. Pat. No. 7,174,293 to Kenyon, which is hereby entirely incorporated by reference), spectrogram bitmap rasters (as described in U.S. Pat. No. 5,437,050, which is hereby entirely incorporated by reference), an activity matrix (as described in U.S. Publication Patent Application No. 2010/0145708, which is hereby entirely incorporated by reference), and an energy flux bitmap raster (as described in U.S. Pat. No. 7,549,052, which is hereby entirely incorporated by reference).

In one example, a signature file includes a sparse feature representation of a media recording. The features of the recording may be obtained from a spectrogram extracted using overlapped short-time Fast Fourier Transforms (FFT). Peaks in the spectrogram can be chosen at time-frequency locations where a corresponding energy value is a local maximum. For examples, peaks may be selected by identifying maximum points in a region surrounding each candidate location. A psychoacoustic masking criterion may also be used to suppress inaudible energy peaks. Each peak can be coded as a pair of time and frequency values. Additionally, an energy amplitude of the peaks may be recorded. In one example, an audio sampling rate is 8 KHz, and an FFT frame size may vary between about 64-1024 bins, with a hop size between frames of about 25-75% overlap with the previous frame. Increasing a frequency resolution may result in less temporal accuracy. Additionally, a frequency axis could be warped and interpolated onto a logarithmic scale, such as mel-frequency.

A number of features or information associated with the features may be combined into a signature file. A signature file may order features as a list arranged in increasing time. Each feature $F_j$ can be associated with a time value $t_j$ in a data construct, and the list can be an array of such constructs; here j is the index of the j-th construct, for example. In an example using a continuous time representation, e.g., successive frames of a spectrogram, the time axis could be implicit in the index into the list array. The time axis within each media recording can be obtained as an offset from a beginning of the recording, and thus time zero refers to the beginning of the recording.

Figure 2:
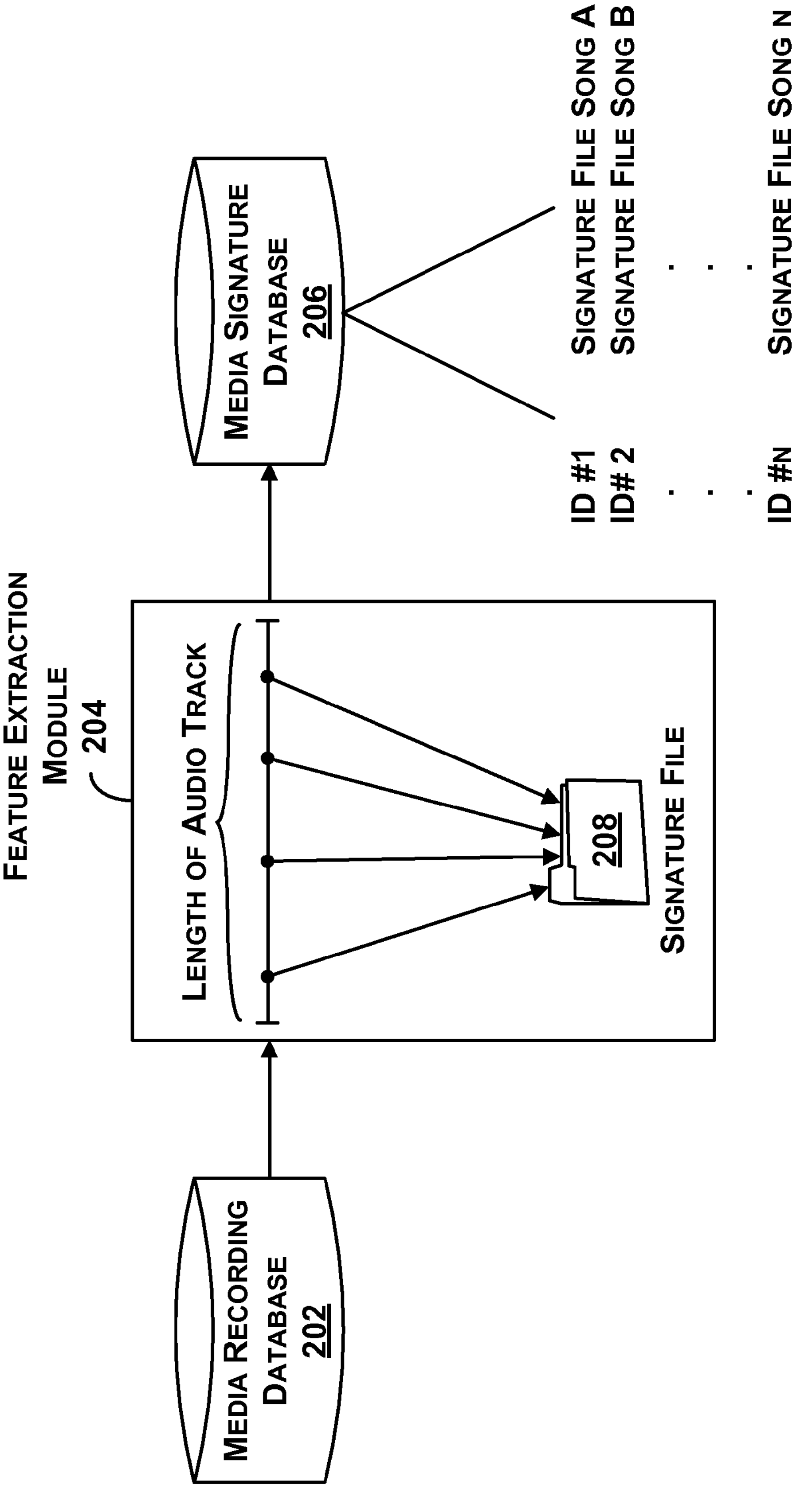
FIG. 2 illustrates an example system to generate a signature file.

FIG. 2 illustrates an example system to generate a signature file. The system includes a media recording database 202, a feature extraction module 204, and a media signature database 206. The media recording database 202 may include a number of copies of media recordings (e.g., songs or videos) or references to a number of copies of the media recordings. The feature extraction module 204 may be coupled to the media recording database 202 and may receive the media recordings for processing. FIG. 2 conceptually illustrates the feature extraction module receiving an audio track from the media recording database 202.

The feature extraction module 204 may extract features from the media recording, using any of the example methods described above, to generate a signature file 208 for the media recording. The feature extraction module 204 may store the signature file 208 in the media signature database 206. The media signature database 206 may store signature files with an associated identifier, as shown in FIG. 2, for example. Generation of the signature files may be performed in a batch mode and a library of reference media recordings can be preprocessed into a library of corresponding feature-extracted reference signature files, for example. Media recordings input to the feature extraction module 204 may be stored into a buffer (e.g., where old recordings are sent out of a rolling buffer and new recordings are received). Features may be extracted and a signature file may be created continuously from continuous operation of the rolling buffer of media recordings so as to represent no gaps in time, or in an on-demand basis as needed. In the on-demand example, the feature extraction module 204 may retrieve media recordings as necessary out of the media recording database 202 to extract features in response to a request for corresponding features. In one example, the resulting library of reference signature files can then be stored or provided to the client device 104.

A size of a resulting signature file may vary depending on a feature extraction method used. In one example, a density of selected spectrogram peaks (e.g., features) may be chosen to be about between 10-50 points per second. The peaks can be chosen as the top N most energetic peaks per unit time, for example, the top 10 peaks in a one-second frame. In an example using 10 peaks per second, using 32 bits to encode each peak frequency (e.g., 8 bits for the frequency value and 24 bits to encode the time offset), 40 bytes per second may be required to encode the features. With an average song length of about three minutes, a signature file size of approximately 7.2 kilobytes may result for a song. For other signature encoding methods, for example, a 32-bit feature at every offset of a spectrogram with a hop size of 100 milliseconds, a similar size fingerprint results.

In another example, a signature file may be on the order of about 5-10 KB, and may correspond to a portion of a media recording from which a sample was obtained that is about 20 seconds long and refers to a portion of the media recording after an end of a captured sample.

In some examples, the signature file may represent a fingerprint of a media recording by describing features of the recording. In this regard, signatures of a media recording may be considered fingerprints of recording, and signatures or fingerprints may be included in a signature file.

The system shown in FIG. 2 may be included within the client device 104 or a server 122. In an example in which the system is included in the client device 104, the media recording database 202 may include locally stored media (e.g., music library). In other examples, the client device 104 may receive raw content (e.g., music files) from a server or captured from a stream such as a radio broadcast, streaming internet radio, etc., and perform signature extraction to populate the database 116 with signature files. In still other examples, upon receiving a new media recording (e.g., user purchases a new song and downloads the song to the client device 104), the client device 104 may extract signature features to generate a signature file for the new media recording. The client device 104 may associate information with generated signature files, such as information identifying the raw content (e.g., song title, artist, genre, etc.), advertisements, etc., or any information received from a server that is associated with the raw content.

Referring back to FIG. 1, the database 116 may include a signature file for a number of media recordings, and may continually be updated to include signature files for new media recordings. The database 116 may receive instructions to delete old signature files as well as instructions to incorporate new signature files from a server. The database 116 may further include information associated with extracted features of a media file. The database 116 may include a number of signature files enabling the client device 104 to perform content identifications of content matching to the locally stored signature files.

The database 116 may also include information for each stored signature file, such as metadata that indicates information about the signature file like an artist name, a length of song, lyrics of the song, time indices for lines or words of the lyrics, album artwork, or any other identifying or related information to the file. Metadata may also comprise data and hyperlinks to other related content and services, including recommendations, ads, offers to preview, bookmark, and buy musical recordings, videos, concert tickets, and bonus content; as well as to facilitate browsing, exploring, discovering related content on the world wide web.

The database 116 may further include information associated with the media rendering source 102, such as playlists of the media rendering source 102 (e.g., including identity of broadcasted content as well as times at which the content is broadcast). Thus, the database 116 may include both content identification and broadcast station identification in a correlated manner.

The content identification module 112 may also include a signature extractor 118 that may be configured to generate a signature stream of extracted features from captured media samples, and each feature may have a corresponding time position within the sample. The signature stream of extracted features can be used to compare to stored signature files in the database 116 to identify a corresponding media recording. In some examples, the signature extractor 116 may be configured to extract features from a media sample using any of the methods described above for generating a signature file, to generate a signature stream of extracted features. A signature stream may be determined and generated in real-time based on an observed media stream, for example.

The content identification module 112 and/or the signature extractor 118 may further be configured to compare alignment of features within the media sample and the signature file to identify matching features at corresponding times.

The content identification module 112 may further be configured to identify a source of broadcasted content by comparison of an identity of the content with a number of playlists of broadcast stations, for example.

The system in FIG. 1 further includes a network 120 to which the client device 104 may be coupled via a wireless or wired link. A server 122 is provided coupled to the network 120, and the server 122 includes a position identification module 124 and a content identification module 126. Although FIG. 1 illustrates the server 122 to include both the position identification module 124 and the content identification module 126, either of the position identification module 124 and/or the content identification module 126 may be separate entities apart from the server 122, for example. In addition, the position identification module 124 and/or the content identification module 126 may be on a remote server connected to the server 122 over the network 120, for example.

In some examples, the client device 104 may capture a media sample and may send the media sample over the network 120 to the server 122 to determine an identity of content in the media sample. The position identification module 124 and the content identification module 126 of the server 122 may be configured to operate similar to the position identification module 110 and the content identification module 112 of the client device 104. In this regard, the content identification module 126 includes a media search engine 128 and may include or be coupled to a database 130 that indexes reference media streams, for example, to compare the received media sample with the stored information so as to identify tracks within the received media sample. Once tracks within the media stream have been identified, track identities or other information may be returned to the client device 104.

In response to a content identification query received from the client device 104, the server 122 may identify a media recoding from which the media sample was obtained, and/or retrieve a signature file corresponding to identified media recording. The server 122 may then return information identifying the media recording, and a signature file corresponding to the media recording to the client device 104.

In other examples, the client device 104 may capture a sample of a media stream from the media rendering source 102, and may perform initial processing on the sample so as to create a signature file/fingerprint of the media sample. The client device 104 may then send the fingerprint information to the position identification module 124 and/or the content identification module 126 of the server 122, which may identify information pertaining to the sample based on the fingerprint information alone. In this manner, more computation or identification processing can be performed at the client device 104, rather than at the server 122, for example.

In still other examples, as described above, the client device 104 may further be configured to perform content identifications locally by comparing alignment of features within the media sample and signature files to identify matching features at corresponding times.

Various content identification techniques are known in the art for performing computational content identifications of media samples and features of media samples using a database of media tracks. The following U.S. patents and publications describe possible examples for media recognition techniques, and each is entirely incorporated herein by reference, as if fully set forth in this description: Kenyon et al, U.S. Pat. No. 4,843,562, entitled "Broadcast Information Classification System and Method"; Kenyon, U.S. Pat. No. 4,450,531, entitled "Broadcast Signal Recognition System and Method"; Haitsma et al, U.S. Patent Application Publication No. 2008/0263360, entitled "Generating and Matching Hashes of Multimedia Content"; Wang and Culbert, U.S. Pat. No. 7,627,477, entitled "Robust and Invariant Audio Pattern Matching"; Wang, Avery, U.S. Patent Application Publication No. 2007/0143777, entitled "Method and Apparatus for Identification of Broadcast Source"; Wang and Smith, U.S. Pat. No. 6,990,453, entitled "System and Methods for Recognizing Sound and Music Signals in High Noise and Distortion"; Blum, et al, U.S. Pat. No. 5,918,223, entitled "Method and Article of Manufacture for Content-Based Analysis, Storage, Retrieval, and Segmentation of Audio Information"; and Master, et al, U.S. Patent Application Publication No. 2010/0145708, entitled "System and Method for Identifying Original Music".

Briefly, the content identification module (within the client device 104 or the server 122) may be configured to receive a media recording and sample the media recording. The recording can be correlated with digitized, normalized reference signal segments to obtain correlation function peaks for each resultant correlation segment to provide a recognition signal when the spacing between the correlation function peaks is within a predetermined limit. A pattern of RMS power values coincident with the correlation function peaks may match within predetermined limits of a pattern of the RMS power values from the digitized reference signal segments, as noted in U.S. Pat. No. 4,450,531, which is entirely incorporated by reference herein, for example. The matching media content can thus be identified. Furthermore, the matching position of the media recording in the media content is given by the position of the matching correlation segment, as well as the offset of the correlation peaks, for example.

Figure 3:
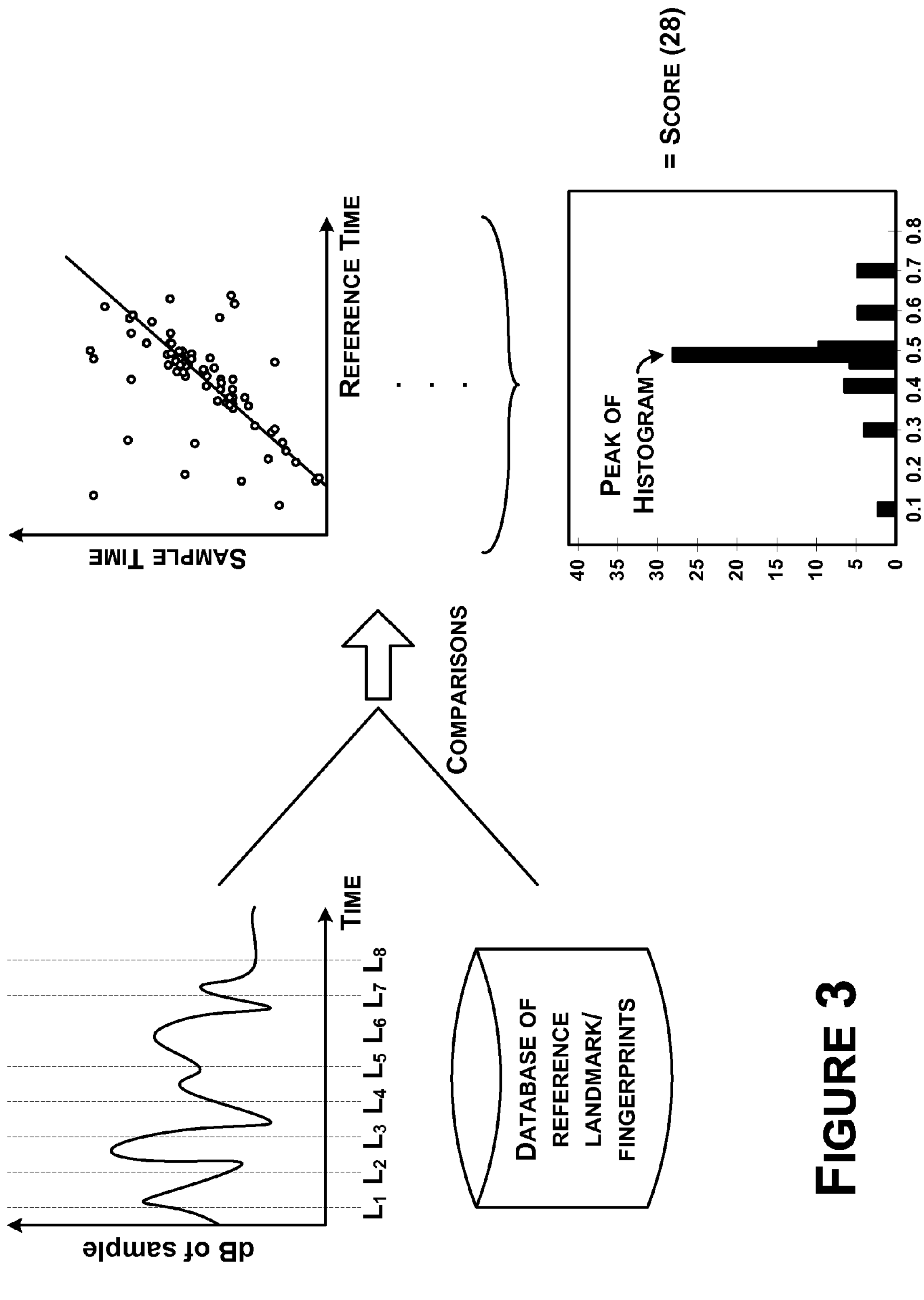
FIG. 3 illustrates another example content identification method.

FIG. 3 illustrates another example content identification method. Generally, media content can be identified by identifying or computing characteristics or fingerprints of a media sample and comparing the fingerprints to previously identified fingerprints of reference media files. Particular locations within the sample at which fingerprints are computed may depend on reproducible points in the sample. Such reproducibly computable locations are referred to as "landmarks." A location within the sample of the landmarks can be determined by the sample itself, i.e., is dependent upon sample qualities and is reproducible. That is, the same or similar landmarks may be computed for the same signal each time the process is repeated. A landmarking scheme may mark about 5 to about 10 landmarks per second of sound recording; however, landmarking density may depend on an amount of activity within the media recording. One landmarking technique, known as Power Norm, is to calculate an instantaneous power at many time points in the recording and to select local maxima. One way of doing this is to calculate an envelope by rectifying and filtering a waveform directly. Another way is to calculate a Hilbert transform (quadrature) of a signal and use a sum of magnitudes squared of the Hilbert transform and the original signal. Other methods for calculating landmarks may also be used.

FIG. 3 illustrates an example plot of dB (magnitude) of a sample vs. time. The plot illustrates a number of identified landmark positions ($L_1$ to $L_8$). Once the landmarks have been determined, a fingerprint is computed at or near each landmark time point in the recording. A nearness of a feature to a landmark is defined by the fingerprinting method used. In some cases, a feature is considered near a landmark if the feature clearly corresponds to the landmark and not to a previous or subsequent landmark. In other cases, features correspond to multiple adjacent landmarks. The fingerprint is generally a value or set of values that summarizes a set of features in the recording at or near the landmark time point. In one example, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks.

Fingerprints can be computed by any type of digital signal processing or frequency analysis of the signal. In one example, to generate spectral slice fingerprints, a frequency analysis is performed in the neighborhood of each landmark timepoint to extract the top several spectral peaks. A fingerprint value may then be the single frequency value of a strongest spectral peak. For more information on calculating characteristics or fingerprints of audio samples, the reader is referred to U.S. Pat. No. 6,990,453, to Wang and Smith, entitled "System and Methods for Recognizing Sound and Music Signals in High Noise and Distortion," the entire disclosure of which is herein incorporated by reference as if fully set forth in this description.

Thus, referring back to FIG. 1, the client device 104 or the server 122 may receive a recording (e.g., media/data sample) and compute fingerprints of the recording. In one example, to identify information about the recording, the content identification module 112 of the client device 104 can then access the database 116 to match the fingerprints of the recording with fingerprints of known audio tracks by generating correspondences between equivalent fingerprints and files in the database 116 to locate a file that has a largest number of linearly related correspondences, or whose relative locations of characteristic fingerprints most closely match the relative locations of the same fingerprints of the recording.

Referring to FIG. 3, a scatter plot of landmarks of the sample and a reference file at which fingerprints match (or substantially match) is illustrated. The sample may be compared to a number of reference files to generate a number of scatter plots. After generating a scatter plot, linear correspondences between the landmark pairs can be identified, and sets can be scored according to the number of pairs that are linearly related. A linear correspondence may occur when a statistically significant number of corresponding sample locations and reference file locations can be described with substantially the same linear equation, within an allowed tolerance, for example. The file of the set with the highest statistically significant score, i.e., with the largest number of linearly related correspondences, is the winning file, and may be deemed the matching media file.

In one example, to generate a score for a file, a histogram of offset values can be generated. The offset values may be differences in landmark time positions between the sample and the reference file where a fingerprint matches. FIG. 3 illustrates an example histogram of offset values. The reference file may be given a score that is equal to the peak of the histogram (e.g., score=28 in FIG. 3). Each reference file can be processed in this manner to generate a score, and the reference file that has a highest score may be determined to be a match to the sample.

In addition, systems and methods described within the publications above may return more than an identity of a media sample. For example, using the method described in U.S. Pat. No. 6,990,453 to Wang and Smith may return, in addition to metadata associated with an identified audio track, a relative time offset (RTO) of a media sample from a beginning of an identified sample. To determine a relative time offset of the recording, fingerprints of the sample can be compared with fingerprints of the original files to which the fingerprints match. Each fingerprint occurs at a given time, so after matching fingerprints to identify the sample, a difference in time between a first fingerprint (of the matching fingerprint in the sample) and a first fingerprint of the stored original file will be a time offset of the sample, e.g., amount of time into a song. Thus, a relative time offset (e.g., 67 seconds into a song) at which the sample was taken can be determined. Other information may be used as well to determine the RTO. For example, a location of a histogram peak may be considered the time offset from a beginning of the reference recording to the beginning of the sample recording.

Other forms of content identification may also be performed depending on a type of the media sample. For example, a video identification algorithm may be used to identify a position within a video stream (e.g., a movie). An example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference. For example, a position of the video sample into a video can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. The extracted fingerprint bits from a frame may be referred to as sub-fingerprints, and a fingerprint block is a fixed number of sub-fingerprints from consecutive frames. Using the sub-fingerprints and fingerprint blocks, identification of video samples can be performed. Based on which frame the media sample included, a position into the video (e.g., time offset) can be determined Furthermore, other forms of content identification may also be performed, such as using watermarking methods. A watermarking method can be used by the position identification module 110 of the client device 104 (and similarly by the position identification module 124 of the server 122) to determine the time offset such that the media stream may have embedded watermarks at intervals, and each watermark may specify a time or position of the watermark either directly, or indirectly via a database lookup, for example.

In some of the foregoing example content identification methods for implementing functions of the content identification module 112, a byproduct of the identification process may be a time offset of the media sample within the media stream. Thus, in such examples, the position identification module 110 may be the same as the content identification module 112, or functions of the position identification module 110 may be performed by the content identification module 112.

In some examples, the client device 104 or the server 122 may further access a media stream library database 132 through the network 120 to select a media stream corresponding to the sampled media that may then be returned to the client device 104 to be rendered by the client device 104. Information in the media stream library database 132, or the media stream library database 132 itself, may be included within the database 116.

An estimated time position of the media being rendered by the media rendering source 102 is determined by the position identification module 110 and used to determine a corresponding position within the selected media stream at which to render the selected media stream. When the client device 104 is triggered to capture a media sample, a timestamp ($T_0$) is recorded from a reference clock of the client device 104. The timestamp corresponding to a sampling time of the media sample is recorded as $T_0$ and may be referred to as the synchronization point. The sampling time may preferably be the beginning, but could also be an ending, middle, or any other predetermined time of the media sample. Thus, the media samples may be time-stamped so that a corresponding time offset within the media stream from a fixed arbitrary reference point in time is known. At any time t, an estimated real-time media stream position $T_r(t)$ is determined from the estimated identified media stream position $T_S$ plus elapsed time since the time of the timestamp:

$$T_r(t)=T_S+t-T_0 \qquad \text{Equation (1)}$$

$T_r(t)$ is an elapsed amount of time from a beginning of the media stream to a real-time position of the media stream as is currently being rendered. Thus, using $T_S$ (i.e., the estimated elapsed amount of time from a beginning of the media stream to a position of the media stream based on the recorded sample), the $T_r(t)$ can be calculated. $T_r(t)$ is then used by the client device 104 to present selected media stream in synchrony with the media being rendered by the media rendering source 102. For example, the client device 104 may begin rendering the selected media stream at the time position $T_r(t)$, or at a position such that $T_r(t)$ amount of time has elapsed so as to render and present the selected media stream in synchrony with the media being rendered by the media rendering source 102.

In some embodiments, the estimated position $T_r(t)$ can be adjusted according to a speed adjustment ratio R. For example, methods described in U.S. Pat. No. 7,627,477, entitled "Robust and invariant audio pattern matching", the entire contents of which are herein incorporated by reference, can be performed to identify the media sample, the estimated identified media stream position $T_S$, and a speed ratio R. To estimate the speed ratio R, cross-frequency ratios of variant parts of matching fingerprints are calculated, and because frequency is inversely proportional to time, a cross-time ratio is the reciprocal of the cross-frequency ratio. A cross-speed ratio R is the cross-frequency ratio (e.g., the reciprocal of the cross-time ratio).

The speed ratio R can be estimated using other methods as well. For example, multiple samples of the media can be captured, and content identification can be performed on each sample to obtain multiple estimated media stream positions $T_S(k)$ at reference clock time $T_0(k)$ for the k-th sample. Then, R could be estimated as:

$$R_k = \frac{T_S(k) - T_S(1)}{T_0(k) - T_0(1)} \qquad \text{Equation (2)}$$

To represent R as time-varying, the following equation may be used:

$$R_k = \frac{T_S(k) - T_S(k-1)}{T_0(k) - T_0(k-1)} \qquad \text{Equation (3)}$$

Thus, the speed ratio R can be calculated using the estimated time positions $T_S$ over a span of time to determine the speed at which the media is being rendered by the media rendering source 102.

Using the speed ratio R, an estimate of the real-time media stream position can be calculated as:

$$T_r(t)=T_S+R(t-T_0) \quad \text{Equation (4)}$$

The real-time media stream position indicates the position in time of the media sample. For example, if the media sample is from a song that has a length of four minutes, and if $T_r(t)$ is one minute, that indicates that the one minute of the song has elapsed. The time information may be determined by the client device during content identification.

Figure 4:
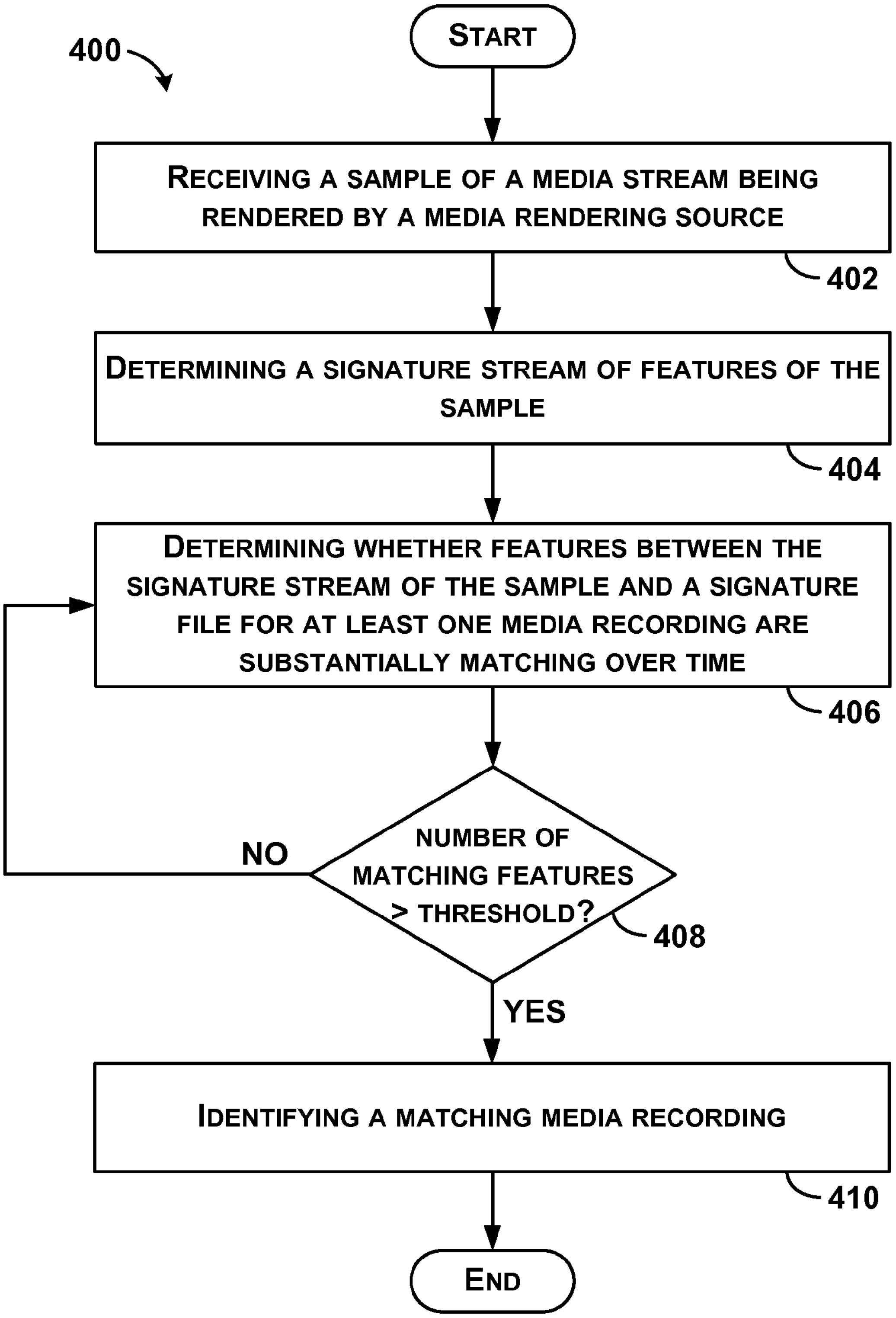
FIG. 4 shows a flowchart of an example method for identifying content in a data stream.

FIG. 4 shows a flowchart of an example method 400 for identifying content in a data stream. Method 400 shown in FIG. 4 presents an embodiment of a method that, for example, could be used with the system shown in FIG. 1, for example, and may be performed by a computing device (or components of a computing device) such as a client device or a server. Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 4 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The method 400 includes, at block 402, receiving a sample of a media stream at a client device. The client device may receive the media stream continuously, sporadically, or at intervals, and the media stream may include any type of data or media, such as a radio broadcast, television audio/video, or any audio being rendered. The media stream may be continuously rendered by a source, and thus, the client device may continuously receive the media stream. In some examples, the client device may receive a substantially continuous media stream, such that the client device receives a substantial portion of the media stream rendered, or such that the client device receives the media stream at substantially all times. The client device may capture a sample of the media stream using a microphone, for example.

The method 400 includes, at block 404, at the client device, determining a signature stream of features of the sample. For example, a client device may receive via an input interface (e.g., microphone) samples of the media stream in an incremental manner as a media stream is being received, and may extract features of these samples to generate corresponding signature stream increments. Each incremental sample may include content at a time after a previous sample, as the media stream rendered by the media rendering source may have been ongoing. The signature stream may be generated based on samples of the media stream using any of the methods described above for extracting features of a sample, for example.

The signature stream may be generated in an ongoing basis in real-time when the media stream is an ongoing media stream. In this manner, features in the signature stream may increase in number over time.

The method 400 includes, at block 406, determining whether features between the signature stream of the sample and a signature file for at least one media recording are substantially matching over time. For example, the client device may compare the features in the signature stream with features in stored signature files. The features in the signature stream may be or include landmark-fingerprint pairs, and the signature files may include landmark-fingerprint pairs for a given reference file, for example. Thus, the client device may perform comparisons of landmark-fingerprint pairs of the signature stream and signature files.

The method 400 includes, at block 408, determining whether a number of matching features is above a threshold, and based on the number of matching features, identifying a matching media recording at block 410. For example, the client device may be configured to determine a number of matching features between the signature stream of the media sample and stored signature files, and rank the number of matching features for each signature file. A signature file that has a highest number of matching features may be considered a match, and a media recording that is identified by or referenced by the signature file may be identified as a matching recording for the sample.

In one example, block 406 may be repeated after block 408 when the number of matching features is less than a threshold, such that features between the signature stream and the signature files can be repeatedly compared. Over time, when a media stream is continuously received, the client device may receive more content for the signature stream (e.g., a longer portion of a song), and accumulation of data may be processed in aggregate with results from processing earlier segments to look for matches within longer samples.

The client device may receive the media stream continuously and may continuously perform content identifications based on comparisons with stored signature files. In this manner, the client device may attempt to identify all content that is received. The content identifications may be substantially continuously performed, such that content identifications are performed at all times or substantially all the time while the client device is operating, or while an application comprising content identification functions is running, for example.

In some examples, content identifications can be performed upon receiving the media stream. The client device may be configured to continuously receive a data stream from a microphone (e.g., always capture ambient audio).

The client device may be configured to continuously perform the content identifications so as to perform a passive content identification without user input (e.g., the user does not have to trigger the client device to perform the content identification). A user of the client device may initiate an application that continuously performs the content identifications or may configure a setting on the client device such that the client device continuously performs the content identifications.

Using the method 400 in FIG. 4, featured content may be identified locally by the client device (based on locally stored content patterns). The method 400 enables all content identification processing to be performed on the client device (e.g., extract features of the sample, search limited set of signature files stored on the phone, etc.). For example, for promotions, signature files related to content of the promotions can be provided to the client device (e.g., preloaded on the client device), and the client device may be configured to operate in a continuous recognition mode and be able to identify this limited set of content.

In one example, when featured content is captured by the client device, the client device can perform the content identification and provide a notification (e.g., pop-up window) indicating recognition. The method 400 may provide a zero-click (e.g., passive) tagging experience for users to notify users when featured content is identified.

In addition to determining an identity of the content, the system in FIG. 1 (or components of the system) may be configured to determine an identity of a media rendering source that rendered the content. In one example, the client device may include or have access to a number of playlists of a number of broadcast stations, and after making a determination of the identity of the content, the client device may refer to the playlists to identify a broadcast station that rendered the content at a time that the content was received (or based on a timestamp of the received media content).

In other examples, a broadcast source may be identified by receiving a time-stamped recording of media content and recordings from broadcast channels, and then identifying characteristics of the recordings for comparison. For example, fingerprints of recordings taken at similar times can be compared, and such a comparison allows for a direct identification of the broadcast channel from which the media content was recorded. Using this method, spectrogram peaks or other characteristics of the signal rather than the direct signals can be compared. Further, the correct broadcast channel can be identified without any content identification (or identification of the content) being required, for example.

Figure 5:
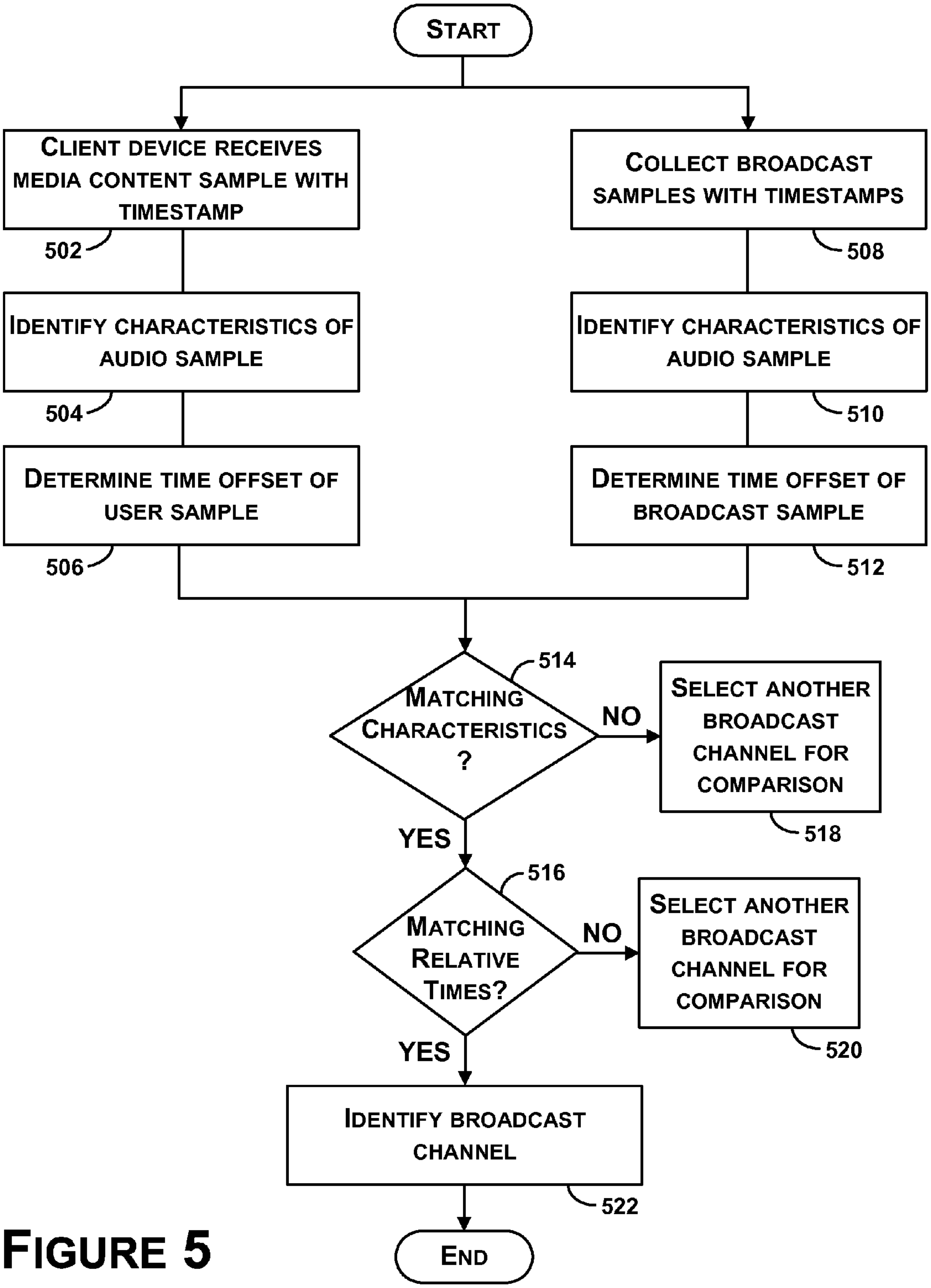
FIG. 5 is a flowchart depicting an example method of identifying a broadcast source.

FIG. 5 is a flowchart depicting an example method of identifying a broadcast source. Initially, in the field, a client device may receive a media content sample, as shown at block 502. The client device will further time stamp the sample in terms of a "real-time" offset from a common time base. Using the technique of Wang and Smith (described more fully below), described within U.S. Patent Application Publication US 2002/0083060, the entire disclosure of which is herein incorporated by reference as if fully set forth in this description, characteristics of the sample and an estimated time offset of the sample within the "original" recording are determined, as shown at blocks 504 and 506 (e.g., to determine the point in a song when the sample was recorded).

At the same time, samples from broadcast channels being monitored are recorded, as shown at block 508. Similar to user samples, each broadcast sample is also time stamped in terms of a "real-time" offset from a common time base. Further, using the technique of Wang and Smith, described below, characteristics and an estimated time offset of the broadcast sample within the "original" recording are determined, as shown at blocks 510 and 512 (e.g., to determine the point in a song when the sample was recorded).

Then the client device sample characteristics are compared with characteristics from broadcast samples that were taken at or near the time the user sample was recorded, as shown at block 514. The client device sample time stamp is used to identify broadcast samples for comparison. Further, the time offset of the client device sample is compared to the time offset of the broadcast sample to identify a match, as shown at block 516. If the real-time offsets are within a certain tolerance, e.g., one second, then the client device sample is considered to be originating from the same source as the broadcast sample, since the probability that a random performance of the same audio content (such as a hit song) is synchronized to less than one second in time is low.

The client device sample is compared with samples from all broadcast channels until a match is found, as shown at blocks 518 and 520. Once a match is found, the broadcast source of the client device sample is identified, as shown at block 522.

Figure 6:
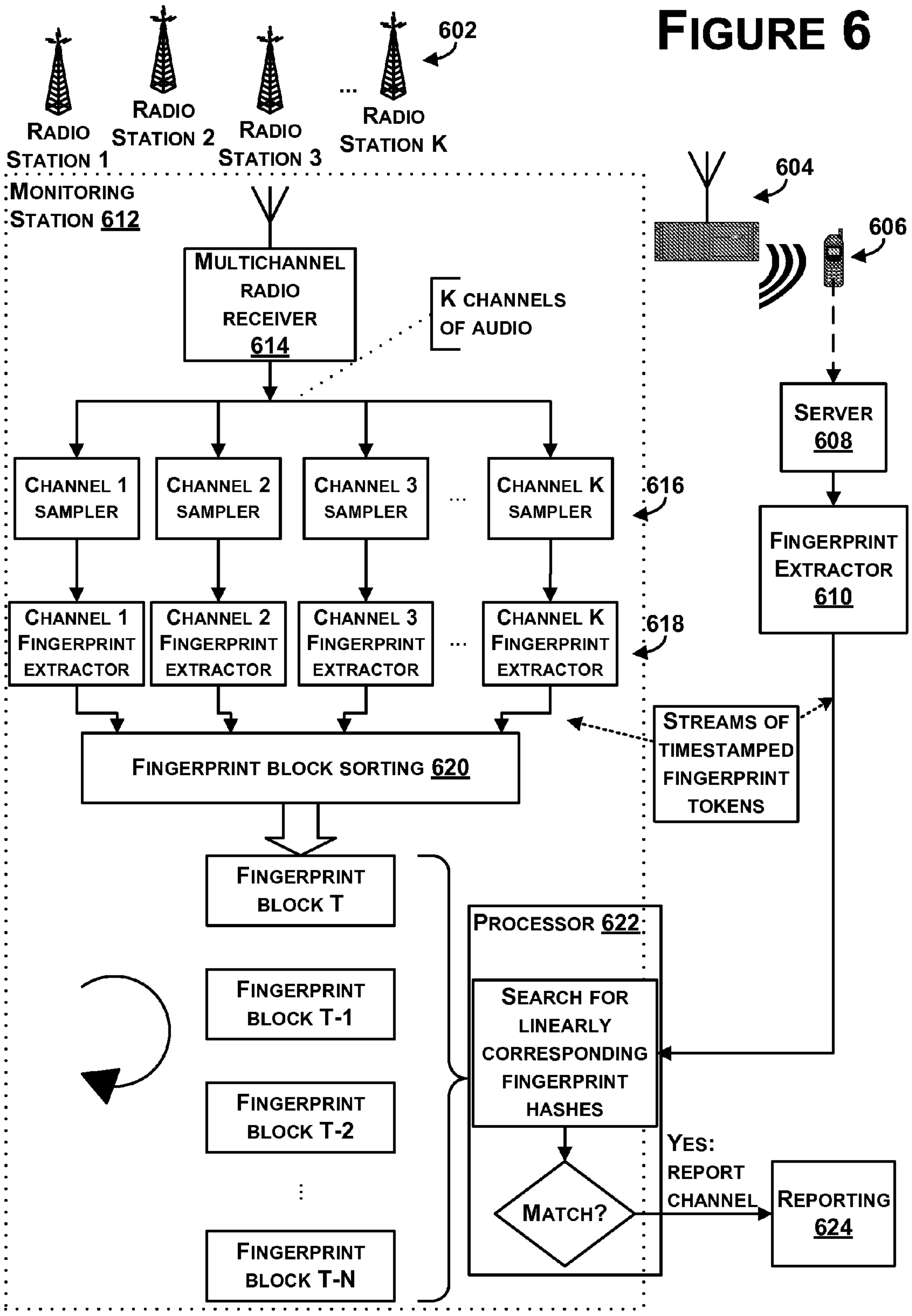
FIG. 6 illustrates one example of a system to identify a broadcast source of media content according to the method shown in FIG. 5.

FIG. 6 illustrates one example of a system to identify a broadcast source of media content (e.g., an audio sample) according to the method shown in FIG. 5. The audio sample may originate from any of radio station 1, radio station 2, radio station 3, . . . , or radio station k 602. A user may record the audio sample being broadcast from an individual receiver 604 on an audio sampling device 606 (e.g., a mobile telephone), along with a sample time (e.g., time according to standard reference clock at which the sample is recorded).

The user may provide the sample to a server 608 (e.g., provide the sample over a network to the server 608 or dial a service to identify broadcast information pertaining to the audio sample, such as an IVR answering system, for example). The audio sample can be provided to the server 608 in the form of acoustic waves, radio waves, a digital audio PCM stream, a compressed digital audio stream (such as Dolby Digital or MP3), or an Internet streaming broadcast. The server 608 may identify or compute characteristics or fingerprints of the sample at landmarks. The server 608 may compute the fingerprints by contacting additional recognition engines, such as a fingerprint extractor 610. The system 608 will thus have timestamped fingerprint tokens of the audio sample that can be used to compare with broadcast samples.

A broadcast monitoring station 612 is configured to monitor each broadcast channel of the radio stations 602 to obtain the broadcast samples. The monitoring station 612 includes a multi-channel radio receiver 614 to receive broadcast information from the radio stations 602. The broadcast information is sent to channel samplers 1 . . . k, as referenced by arrow 616. Each channel sampler 616 has a channel fingerprint extractor 618 for calculating fingerprints of the broadcast samples, as described above, and as described within Wang and Smith.

The monitoring station 612 can then sort and store fingerprints for each broadcast sample for a certain amount of time within a fingerprint block sorter 620. The monitoring station 612 can continually monitor audio streams from the broadcasters while noting the times corresponding to the data recording. After a predetermined amount of time, the monitoring station 612 can write over stored broadcast sample fingerprints to refresh the information to coordinate to audio samples currently being broadcast, for example. A rolling buffer of a predetermined length can be used to hold recent fingerprint history. Since the fingerprints within the rolling buffer will be compared against fingerprints generated from the incoming sample, fingerprints older than a certain cutoff time can be ignored, as they will be considered to be representing audio collected too far in the past. The length of the buffer is determined by a maximum permissible delay plausible for a real-time simultaneous recording of audio signals originating from a real-time broadcast program, such as network latencies of Voice-over-IP networks, internet streaming, and other buffered content. The delays can range from a few milliseconds to a few minutes.

A rolling buffer may be generated using batches of time blocks, e.g., perhaps M=10 seconds long each: every 10 seconds blocks of new [hash+channel ID+timestamp] are dumped into a big bucket and sorted by hash. Then each block ages, and parallel searches are done for each of N blocks to collect matching hashes, where N*M is the longest history length, and (N−1)*M is the shortest. The hash blocks can be retired in a conveyor-belt fashion.

Upon receiving an inquiry from the client device 606 to determine broadcast information corresponding to a given audio sample, the monitoring station 612 searches for corresponding fingerprint hashes within the broadcast sample fingerprints (e.g., linearly corresponding). In particular, a processor 622 in the monitoring station 612 first selects a given broadcast channel to determine if a broadcast sample identity of a broadcast sample recorded at or near the client device sample time matches the client device audio sample fingerprints. If not, the sorter 620 selects the next broadcast channel and continues searching for a match.

Fingerprints of the broadcast samples and the client device audio sample are matched by generating correspondences between equivalent fingerprints, and the file that has the largest number of linearly related correspondences or whose relative locations of characteristic fingerprints most closely match the relative locations of the same fingerprints of the audio sample may be deemed the matching media file.

In particular, the client device audio sample fingerprints are used to retrieve sets of matching fingerprints stored in the sorter 620. The set of retrieved fingerprints are then used to generate correspondence pairs containing sample landmarks and retrieved file landmarks at which the same fingerprints were computed. The resulting correspondence pairs are then sorted by media file identifiers, generating sets of correspondences between sample landmarks and file landmarks for each applicable file. Each set is scanned for alignment between the file landmarks and sample landmarks. That is, linear correspondences in the pairs of landmarks are identified, and the set is scored according to the number of pairs that are linearly related. A linear correspondence occurs when a large number of corresponding sample locations and file locations can be described with substantially the same linear equation, within an allowed tolerance. The file of the set with the highest score, i.e., with the largest number of linearly related correspondences, is the winning file.

Furthermore, fingerprint streams of combinatorial hashes from multiple channels may be grouped into sets of [hash+channel ID+timestamp], and these data structures may be placed into a rolling buffer ordered by time. The contents of the rolling buffer may further be sorted by hash values for a faster search for matching fingerprints with the audio sample, e.g., the number of matching temporally-aligned hashes is the score.

A further step of verification may be used in which spectrogram peaks may be aligned. Because the Wang and Smith technique generates a relative time offset, it is possible to temporally align the spectrogram peak records within about 10 ms in the time axis, for example. Then, the number of matching time and frequency peaks can be determined, and that is the score that can be used for comparison.

Once the correct audio sound has been identified, the result can be reported to the client device 606 or a system 624 by any suitable method. For example, the result can be reported by a computer printout, email, web search result page, SMS (short messaging service) text messaging to a mobile phone, computer-generated voice annotation over a telephone, or posting of the result to a web site or Internet account that the user can access later. The reported results can include identifying information of the source of the sound such as the name of the broadcaster, broadcast recording attributes (e.g., performers, conductor, venue); the company and product of an advertisement; or any other suitable identifiers. Additionally, biographical information, information about concerts in the vicinity, and other information of interest to fans can be provided; hyperlinks to such data may be provided. Reported results can also include the absolute score of the sound file or its score in comparison to the next highest scored file.

Figure 7:
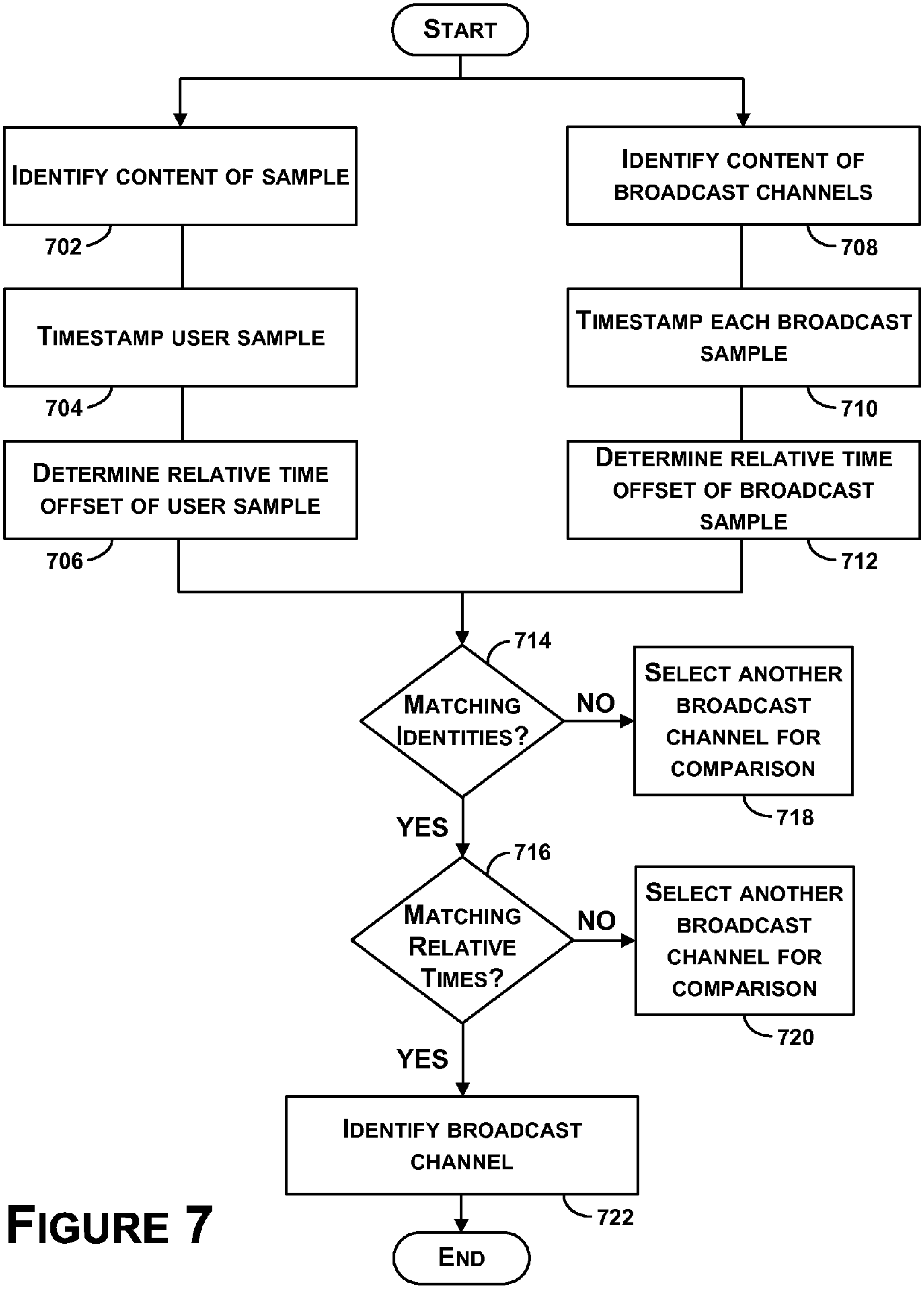
FIG. 7 illustrates a flowchart depicting one example of functional steps for performing a timestamped broadcast identification.

In alternate examples, a broadcast source may be identified by performing a timestamped identification. FIG. 7 illustrates a flowchart depicting one example of functional steps for performing a timestamped broadcast identification. Initially, a client device sample is identified using a content identification means, as shown at block 702. While the client device sample is collected, a client device sample timestamp (UST) is taken to mark the beginning time of the audio sample based on a standard reference clock, as shown at block 704. Using the identification method disclosed by Wang and Smith, as discussed above, produces an accurate relative time offset between a beginning of the identified content file from the database and a beginning of the audio sample being analyzed, e.g., a user may record a ten second sample of a song that was 67 seconds into a song. Hence, a client device sample relative time offset (USRTO) and a client device sample identity are noted as a result of identifying the client device sample, as shown at block 706.

At the same time, broadcast audio samples are taken periodically from each of at least one broadcast channel being monitored by a monitoring station; and similarly, a content identification step is performed for each broadcast channel, as shown at block 708. The broadcast samples should be taken frequently enough so that at least one sample is taken per audio program (i.e., per song) in each broadcast channel. For example, if the monitoring station records 10 second samples, after a content identification, the monitoring station would know the length of the song, and also how much longer before the song is over. The monitoring station could thus calculate the next time to sample a broadcast channel based on the remaining length of time of the song, for example.

For each broadcast sample, a broadcast sample timestamp (BST) is also taken to mark the beginning of each sample based on the standard reference clock, as shown at block 710. Further, a relative time offset between the beginning of the identified content file from the database and the beginning of the broadcast sample being analyzed is computed. Hence, a broadcast sample relative time offset (BSRTO) and a broadcast sample identity is noted as a result of identifying each broadcast audio sample, as shown at block 712.

To identify a broadcast source, the client device sample and broadcast audio samples are compared to first identify matching sample identities, as shown at block 714, and then to identify matching "relative times" as shown at block 716. If no matches are found, another broadcast channel is selected for comparison, as shown at blocks 718 and 720. If a match is found, the corresponding broadcast information is reported back to the client device, as shown at block 722.

The comparisons of the client device (user sample) and broadcast samples are performed as shown below:

$$\text{(User sample identity)}=\text{(Broadcast sample identity)} \quad \text{Equation (5)}$$

$$\text{USRTO}+(\text{ref. time}-\text{UST})=\text{BSRTO}+(\text{ref. time}-\text{BST})+\text{delay} \quad \text{Equation (6)}$$

where the ref time is a common reference clock time, and (ref. time–UST) and (ref. time–UST) take into account the possibility for different sampling times by the user audio sampling device and the monitoring station (e.g., (ref. time–BST)=elapsed time since last broadcast sample and now). For example, if broadcast stations are sampled once per minute, and since user samples can occur at any time, to find an exact match, a measure of elapsed time since last sample for each of the broadcast and user sample may be needed. In Equation (6), the delay is a small systematic tolerance that depends on the time difference due to propagation delay of the extra path taken by the user audio sample, such as for example, latency through a digital mobile phone network. Furthermore, any algebraic permutation of Equation (6) is within the scope of the present application.

Thus, matching the sample identities ensures that the same song, for example, is being compared. Then, matching the relative times translates the samples into equivalent time frames, and enables an exact match to be made. As a specific example, suppose the monitoring station samples songs from broadcasters every three minutes, so that at 2:02 pm the station begins recording a 10 second interval of a 4 minute long song from a broadcaster, which began playing the song at 2:00 pm. Thus, BST=2:02 pm, and BSTRO=2 minutes. Suppose a user began recording the same song at 2:03 pm. Thus, UST=2:03, and USRTO=3 minutes. If the user contacts the monitoring station now at 2:04 pm to identify a broadcast source of the song, Equation (2) above will be as follows (assuming a negligible delay):

$$\text{USRTO}+(\text{ref. time}-\text{UST})=\text{BSRTO}+(\text{ref. time}-\text{BST})+\text{delay}\rightarrow 3+(2{:}04-2{:}03)=2+(2{:}04-2{:}02)=4$$

Thus, the monitoring station will know that it has made an exact match of songs, and the monitoring station also knows the origin of the song. As a result, the monitoring station can inform the user of the broadcast source.

Figure 8:
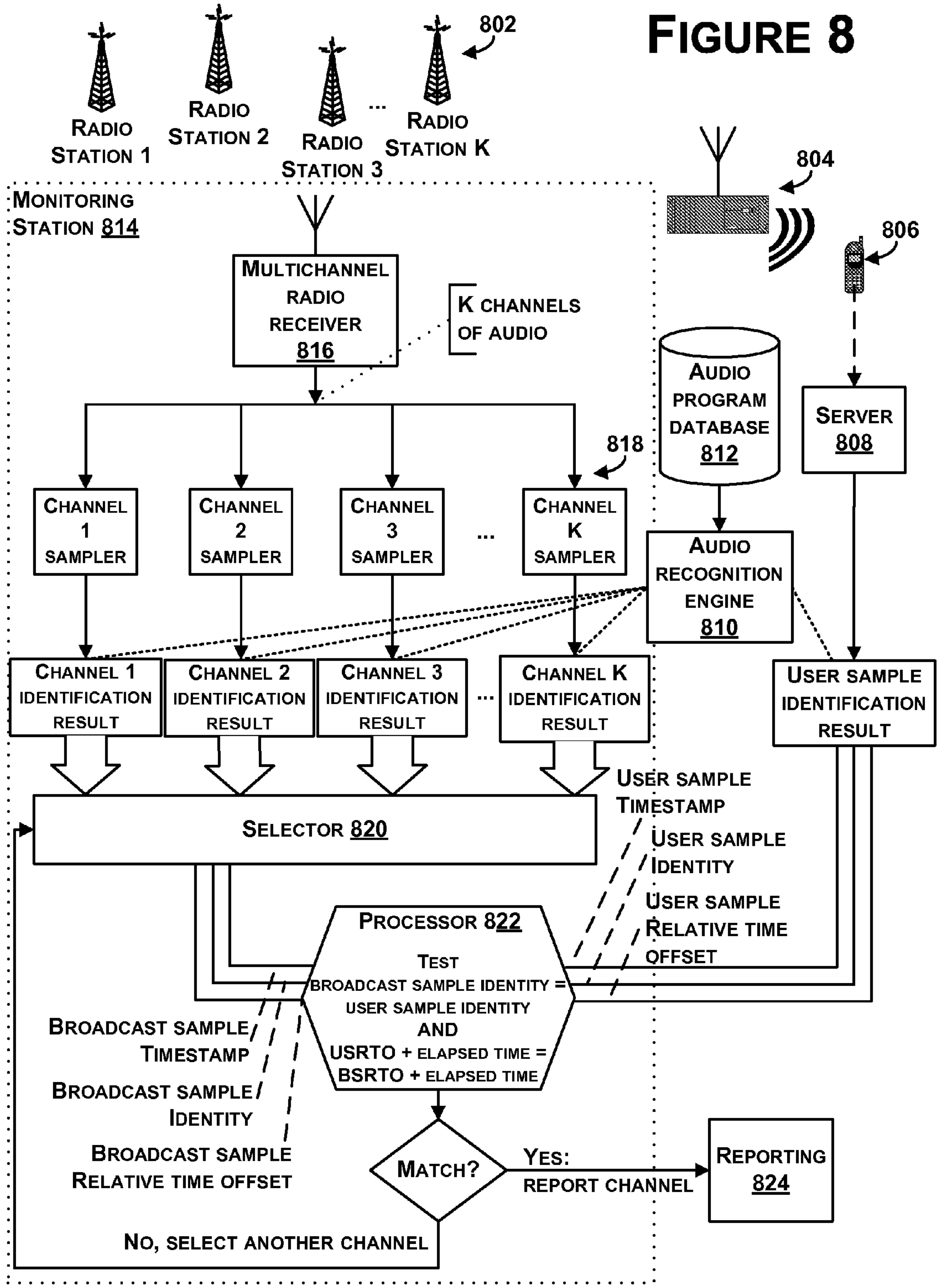
FIG. 8 illustrates one example of a system for identifying a broadcast source of an audio sample according to the method illustrated in FIG. 7.

FIG. 8 illustrates one example of a system for identifying a broadcast source of an audio sample according to the method illustrated in FIG. 7. The audio sample may originate from any of radio station 1, radio station 2, radio station 3, . . . , or radio station k 802. A client device 806 may record the audio sample being broadcast from an individual receiver 804, along with a sample time (e.g., time according to standard reference clock at which the sample is recorded). The client device 806 may then provide the sample to a server 808, for example. The server 808 may identify the sample by contacting an audio recognition engine 810.

The audio recognition engine 810 will then identify the audio sample by performing a lookup within an audio program database 812 using the technique described within Wang and Smith, as described above, for example. In particular, the audio sample may be a segment of media data of any size obtained from a variety of sources. To perform data recognition, the sample should be a rendition of part of a media file indexed in a database. The indexed media file can be thought of as an original recording, and the sample as a distorted and/or abridged version or rendition of the original recording. The sample may correspond to only a small portion of the indexed file. For example, recognition can be performed on a ten-second segment of a five-minute song indexed in the database.

The database index contains fingerprints representing features at particular locations of the indexed media files. The unknown media sample is identified with a media file in the database (e.g., a winning media file) whose relative locations of fingerprints most closely match the relative locations of fingerprints of the sample. In the case of audio files, the time evolution of fingerprints of the winning file matches the time evolution of fingerprints in the sample.

Using the database of files, a relative time offset of sample can be determined. For example, the fingerprints of the audio sample can be compared with fingerprints of original files. Each fingerprint occurs at a given time, so after matching fingerprints to identify the audio sample, a difference in time between a first fingerprint of the audio sample and a first fingerprint of the stored original file will be a time offset of the audio sample, e.g., amount of time into a song. Thus, a relative time offset (e.g., 67 seconds into a song) at which the user began recording the song can be determined.

In addition, an audio sample can be analyzed to identify its content using a localized matching technique. For example, generally, a relationship between two audio samples can be characterized by first matching certain fingerprint objects derived from the respective samples. A set of fingerprint objects, each occurring at a particular location, is generated for each audio sample. Each location is determined in dependence upon the content of respective audio sample and each fingerprint object characterizes one or more local features at or near the respective particular location. A relative value is next determined for each pair of matched fingerprint objects. A histogram of the relative values is then generated. If a statistically significant peak is found, the two audio samples can be characterized as substantially matching.

The audio recognition engine 810 will return the identity of the audio sample to the client device 806, along with a relative time offset of the audio sample as determined using the Wang and Smith technique, for example. The client device 806 may contact the monitoring station 814 and using the audio sample identity, relative time offset, and sample timestamp, the monitoring station 814 can identify the broadcast source of the audio sample.

The broadcast monitoring station 814 monitors each broadcast channel of the radio stations 802. The monitoring station 814 includes a multi-channel radio receiver 816 to receive broadcast information from the radio stations 802. The broadcast information is sent to channel samplers 1 . . . k 818, which identify content of the broadcast samples by contacting the audio recognition engine 810. In addition, the monitoring station 814 may also include a form of an audio recognition engine to reduce delays in identifying the broadcast samples, for example.

The monitoring station 814 can then store the broadcast sample identities for each broadcast channel for a certain amount of time. After a predetermined amount of time, the monitoring station 814 can write over stored broadcast sample identities to refresh the information to coordinate to audio samples currently being broadcast, for example.

Upon receiving an inquiry from the client device 806 to determine broadcast information corresponding to a given audio sample, the monitoring station 814 performs the tests according to Equations (5) and (6) above. In particular, a processor 822 in the monitoring station 814 first selects a given broadcast channel (using selector 820) to determine if a broadcast sample identity of a broadcast sample recorded at or near the user sample time matches the user audio sample identity. If not, the selector 820 selects the next broadcast channel and continues searching for an identity match.

Once an identity match is found, the processor 822 then determines if the client device sample relative time matches the broadcast sample relative time for this broadcast channel. If not, the selector 820 selects the next broadcast channel and continues searching for an identity match. If the relative times match (within an approximate error range) then the processor 722 considers the audio sample and the broadcast sample to be a match.

After finding a match, the processor 822 reports information pertaining to the broadcast channel to a reporting center 824. The processor 822 may also report the broadcast information to the user sampling device 806, for example. The broadcast information may include a radio channel identification, promotional material, advertisement material, discount offers, or other material relating to the particular broadcast station, for example.

Figure 9:
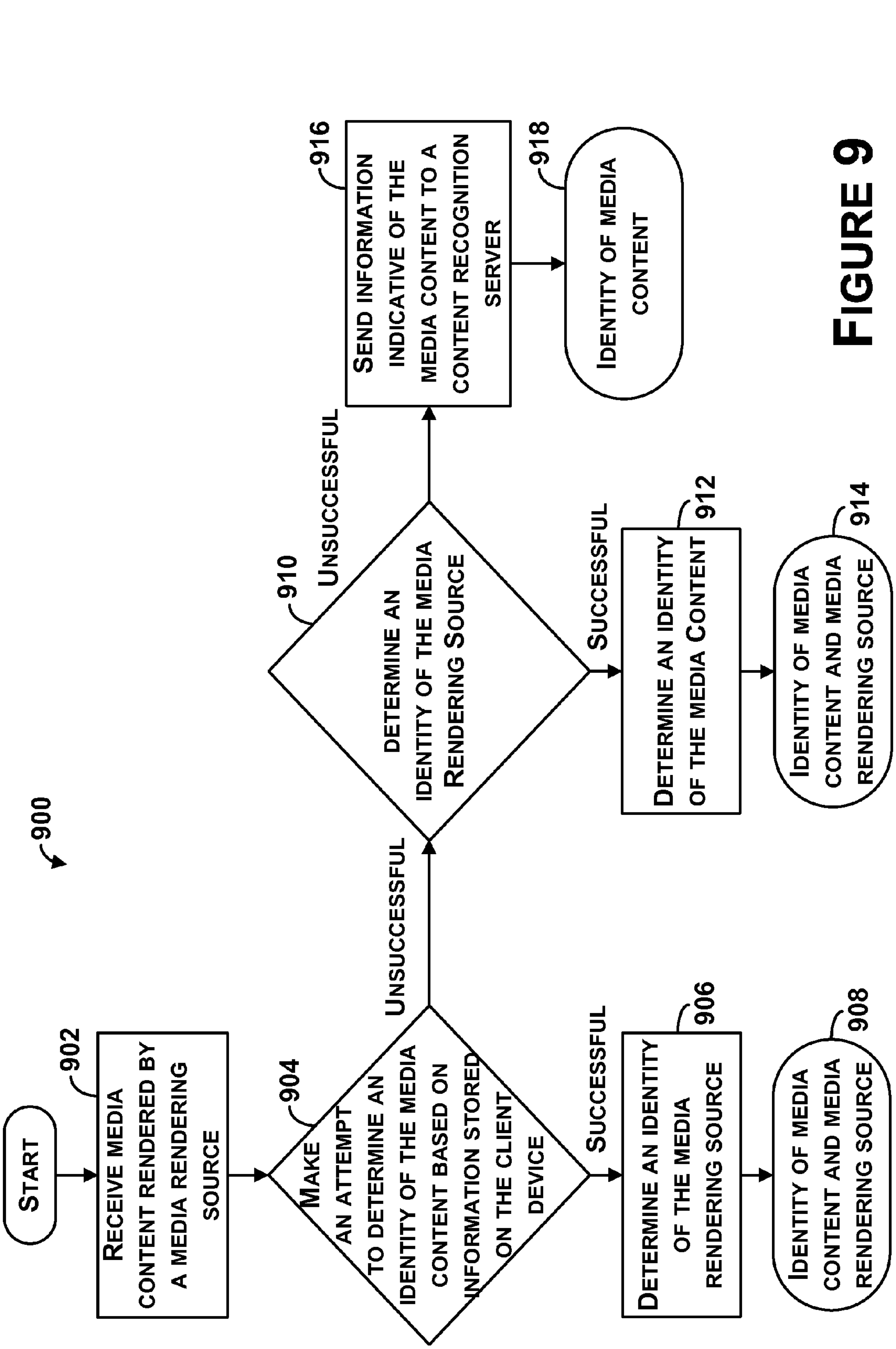
FIG. 9 is a flowchart depicting an example method for identifying information of a broadcast station and information of broadcasted content.

As described with reference to FIGS. 1-8, an identification of an identity of the content as well as an identification of a media rendering source that rendered the content may be determined. FIG. 9 is a flowchart depicting an example method 900 for identifying information of a broadcast station and information of broadcasted content. The method 900 in FIG. 9 may be performed by a client device, or by a client device and a server that is coupled to the client device.

Initially, at block 902, the method 900 includes receive media content rendered by a media rendering source. The media content may be received at a client device in a number of ways including the client device using a microphone to record ambient audio, video, etc., or via any data communications received at the client device.

At block 904, the method 900 includes the client device make an attempt to determine an identity of the media content based on information stored on the client device. As an example, after receiving the media content, the client device may initially attempt to determine an identity of the media content locally by comparing characteristics of the media content with signature files of media content stored on the client device. As described above, each signature file may be indicative of one or more features extracted from recordings of media content and also information identifying the media content. Thus, the client device may determine or extract features of the received media content, and compare the features of the received media content with the features indicated by the signature files stored on the client device to determine a match of one or more features.

At block 906, the method 900 includes, if the attempt at block 904 was successful, determine an identity of the media rendering source. The identity of the media rendering source may be determined in a number of ways. As one example, the client device may determine the identity of the media rendering source using the determined identity of the media content and referring to a playlist of content rendered by the media rendering source. The client device may store a number of playlists for a number of media rendering sources (e.g., radio playlists, television guides, etc.), and can search the playlists for the identified media content to correlate a media rendering source with the identified content.

The client device may receive playlists for media rendering sources based on predetermined settings (e.g., always receive playlists for predetermined sources each day), or based on other criteria. As one example, a broadcast server may receive information indicating a geographic location of the client device and may provide to the client device current playlists for broadcast stations that operate at or near the geographic location of the client device.

As another example, the client device may send information indicative of the identity of the media content to a broadcast identification server to determine the identity of the media rendering source, and the client device can receive information indicative of the identity of the media rendering source from the broadcast identification server. The broadcast identification server may be configured to determine an identity of the media rendering source using any of the methods described herein.

As still another example, the client device itself may determine the identity of the media rendering source using any of the methods described herein, and thus may be configured to perform functions of the broadcast identification server. The client device may determine the identity of the media rendering source based on a temporal comparison of characteristics of the media content with characteristics of a source sample taken from content rendered by the media rendering source, for example.

In some examples, by determining the identity of the media rendering source, a playlist of content of the media rendering source may be created and stored on the client device.

At block 908, the method 900 results in providing an identity of media content and an identity of the media rendering source. Thus, in one example, the method 900 includes the client device determining the identity of the media content, and the client device using the identity of the media content to determine the identity of the media rendering source.

At block 910, the method 900 includes, if the attempt at block 904 was unsuccessful, determine an identity of the media rendering source. As one example, if the client device is unable to determine the identity of the media content, such as in instances in which the client device does not have a matching signature file stored on the client device, the identity of the media rendering source may then be determined first followed by determining the identity of the media content.

As mentioned above, the identity of the media rendering source may be determined in an number of ways including the client device itself making the determination, or the client device sending a query to a broadcast identification server that will make the determination and provide a response to the client device.

At block 912, the method 900 includes, if the determination at block 910 was successful, determine an identity of the media content. For example, the identity of the media content may be determined via reference to a playlist and using the timestamp of the received media content. Block 912 may be performed by the client device or by the broadcast identification server.

At block 914, the method 900 includes providing an identity of media content and an identity of the media rendering source. Thus, in one example, the method 900 includes the client device or a broadcast server first determining the identity of the media rendering source and using the identity of the media rendering source to determine the identity of the media content.

At block 916, the method 900 includes, if the determination at block 910 was unsuccessful, send information indicative of the media content to a content recognition server. As an example, if the attempt of the client device to determine the identity of the media content was unsuccessful and the determination of the identity of the media rendering source was unsuccessful, the media content can be provided to a content recognition server to determine the identity of the media content.

At block 918, the method 900 includes providing an identity of the media content. The content recognition server may provide a response to the client device.

In examples, the method 900 provides functions for determining both an identity of the media content and an identity of the media rendering source in a cascading method so as to use functionality that avoids computational intensity when possible. As an example, a broadcast channel identification with playlist cross lookup may avoid computational identification. As another example, content identification performed by the client device locally may provide a least amount of computational intensity and provide a result in a shortest amount of time (e.g., no need to communicate with a server), and may also take load off of recognition servers. The method 900 illustrates one order of attempts that may be performed. In other examples, after an unsuccessful attempt at block 904, the client device may proceed to block 916 to send information to the content recognition server for identification.

In one example implementation, a user may be listening to a radio station, and may operate a mobile telephone to receive a sample of audio (e.g., record a sample), and the client device may be configured to determine an identity of the song/commercial as well as an identity of the radio station (using the method 900). The client device may further receive information from content servers related to the song or radio station, and provide such information for display.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A method comprising:

receiving at a client device media content rendered by a media rendering source;

the client device first making an attempt to determine an identity of the media content based on information stored on the client device by comparing characteristics of the media content with one or more signature files of media content stored on the client device to determine a match, wherein the one or more signature files are each indicative of one or more features extracted from reference media content and corresponding information identifying the reference media content;

based on the attempt of the client device to determine the identity of the media content using the information stored on the client device being unsuccessful due to the client device lacking a matching signature file stored on the client device, the client device then making an attempt to determine an identity of the media rendering source; and based on the attempt of the client device to determine the identity of the media content and on the attempt of the client device to determine the identity of the media rendering source both being unsuccessful, the client device sending a sample of the media content to a content recognition server and requesting the content recognition server to determine the identity of the media content.

2. The method of claim 1, wherein determining the identity of the media rendering source comprises:

sending information indicative of the media content to a broadcast identification server to determine the identity of the media rendering source; and receiving information indicative of the identity of the media rendering source from the broadcast identification server.

3. The method of claim 2, further comprising also receiving from the broadcast identification server information indicative of the identity of the media content.

4. The method of claim 2, further comprising the client device making an attempt to determine the identity of the media content based on reference to a playlist of content rendered by the media rendering source.

5. The method of claim 4, wherein the playlist of content rendered by the media rendering source is stored on the client device.

6. The method of claim 1, wherein determining the identity of the media rendering source comprises:

sending information indicative of the media content to a broadcast identification server to determine the identity of the media rendering source; and wherein based on determining the identity of the media rendering source comprises based on receiving information indicative of the identity of the media rendering source from the broadcast identification server.

7. The method of claim 1, wherein determining the identity of the media rendering source comprises the client device determining the identity of the media rendering source based on a temporal comparison of characteristics of the media content with characteristics of a source sample taken from content rendered by the media rendering source.

8. The method of claim 1, wherein a given signature file includes a temporally mapped collection of the one or more features extracted the given media content, wherein each of the one or more features describes the given media content in a vicinity of a mapped timepoint.

9. The method of claim 1, wherein the client device determining the identity of the media content based on information stored on the client device comprises:

determining one or more features of the received media content; and comparing the one or more features of the received media content with the one or more features extracted from reference media content as indicated by the one or more signature files to determine a match of one or more features.

10. The method of claim 1, wherein receiving at the client device media content rendered by the media rendering source comprises receiving the media content at the client device using a microphone of the client device.

11. A non-transitory computer readable medium having stored therein instructions executable by a computing device to cause the computing device to perform functions comprising:

receiving media content rendered by a media rendering source;

the computing device first making an attempt to determine an identity of the media content based on information stored on the computing device by comparing characteristics of the media content with one or more signature files of media content stored on the computing device to determine a match, wherein the one or more signature files are each indicative of one or more features extracted from reference media content and corresponding information identifying the reference media content;

based on the attempt of the computing device to determine the identity of the media content using the information stored on the computing device being unsuccessful due to the computing device lacking a matching signature file stored on the computing device, the computing device then making an attempt to determine an identity of the media rendering source; and based on the attempt of the computing device to determine the identity of the media content and on the attempt of the computing device to determine the identity of the media rendering source both being unsuccessful, the computing device sending a sample of the media content to a content recognition server and requesting the content recognition server to determine the identity of the media content.

12. The non-transitory computer readable medium of claim 11, wherein determining the identity of the media rendering source comprises:

sending information indicative of the media content to a broadcast identification server to determine the identity of the media rendering source; and receiving information indicative of the identity of the media rendering source from the broadcast identification server.

13. A device comprising:

a database configured to receive and store one or more signature files of media content that are each indicative of one or more features extracted from reference media content and information identifying the reference media content; and a content identification module, including one or more processors executing instructions stored on non-transitory computer readable media, coupled to the database and configured to (i) make an attempt to determine an identity of received media content rendered by a media rendering source by comparing characteristics of the media content with the one or more signature files of media content stored on the database to determine a match, (ii) based on the attempt to determine the identity of received media content being unsuccessful due to lacking a matching signature file stored on the database, to then make an attempt to determine an identity of the media rendering source, and (iii) based on the attempt to determine the identity of the received media content and on the attempt to determine the identity of the media rendering source both being unsuccessful, to send a sample of the media content to a content recognition server and request the content recognition server to determine the identity of the media content.

14. The device of claim 13, wherein the database is configured to store a playlist of content rendered by the media rendering source, and wherein the content identification module is further configured to attempt to determine the identity of the media rendering source based on reference to the playlist of content rendered by the media rendering source.

* * * * *